Nov. 24, 1959  J. V. RALSTON  2,914,630
SIGNALLING MEANS FOR FLUID PRESSURE ACTUATORS
Filed July 23, 1957
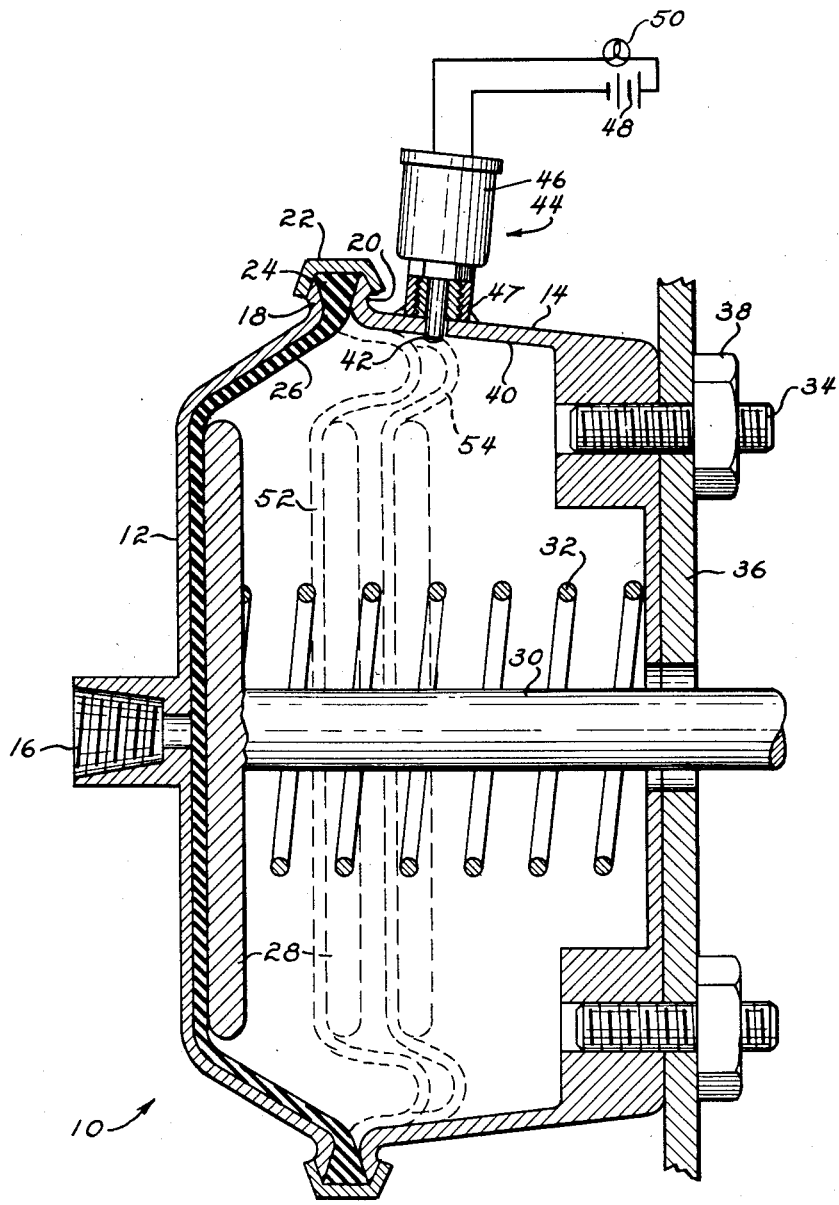
INVENTOR
JAMES V. RALSTON
BY *Scrivener & Parker*
ATTORNEYS

United States Patent Office 2,914,630
Patented Nov. 24, 1959

2,914,630

SIGNALLING MEANS FOR FLUID PRESSURE ACTUATORS

James V. Ralston, Elyria, Ohio, assignor to Bendix-Westinghouse Automotive Air Brake Company, Elyria, Ohio, a corporation of Delaware Application July 23, 1957, Serial No. 673,692

2 Claims. (Cl. 200—83)

This invention relates to signalling means for fluid pressure actuators and more particularly to signalling means for actuators which is particularly, though not exclusively, useful for indicating greater than normal actuator movement.

In the use of fluid pressure actuators, particularly those utilized for pneumatic brake actuation, it is difficult for the operator to sense the point at which the brake linings have become sufficiently worn to require adjustment of the slack adjuster. This is particularly true in those brake systems where actuator movement is not a reflection of brake valve movement and it is possible in such systems for the actuator to become dangerously close to running out of stroke due to brake lining wear before the operator realizes the need for corrective action.

It is an object, therefore, of the present invention to provide improved means for indicating when a fluid pressure actuator has greater than normal movement.

More specifically it is an object of the present invention to provide electric switch means which is engageable by the pressure responsive element of an actuator to energize signaling means to indicate greater than normal movement of the element.

Other objects and their attendant advantages will become apparent as the following detailed description is read in conjunction with the accompanying drawing wherein the single figure is a sectional view of a power actuator incorporating the signalling means of the present invention.

Referring now to the drawing, 10 designates a power actuator housing comprising a pressure plate 12 and a non-pressure plate 14, the former having a central inlet port 16 for connection to a pressure source (not shown) which may be controlled by a suitable valve such as a brake valve. The plates 12, 14 may be provided with opposed flanges 18, 20 engageable by the sides of a U-shaped annular clamping ring 22 to clamp between the flanges a wedge-shaped annular peripheral portion 24 of a flexible diaphragm 26 which serves to divide the interior of housing 10 into pressure and atmospheric chambers in the usual manner. Abutting the atmospheric side of the diaphragm 26 is a push-plate 28 having concentrically and integrally attached thereto a push-rod 30 which is connected at its opposite end to an actuating lever (not shown) which for purposes of illustration may be deemed to comprise a slack adjuster associated with a brake lever. The diaphragm 26, push-rod 30 and push-plate 28 are retained in the normal de-energized position shown in full lines in the drawing by means of a compression spring 32 which acts at one end against the push-plate and at the opposite end against the interior wall of the non-pressure plate 14. The entire actuator is mounted in its position of use by means of studs 34 which register with holes in a supporting frame 36 to receive nuts 38.

Preferably the non-pressure plate 14 is modified from the conventional construction to provide a substantially cylindrical horizontal and rearwardly projecting interior wall 40 which has extending through the side thereof a plunger 42 of a switch 44, preferably of the conventional micro variety, enclosed in a housing 46 which is attached to the exterior of the plate 14 in a suitable manner, as by being screwed into an interiorly threaded ferrule 47 welded to the exterior of the housing as shown. The switch 44 forms part of a circuit which includes an electrical source 48 and a signalling device 50 which may comprise a lamp mounted in the cab of an automotive vehicle or a buzzer or other alarm which is energized when the switch 44 is closed.

The diaphragm, being of flexible material, the marginal portion 27 thereof between the push-plate 28 and the clamped wedge-shaped portion 24 is adapted to roll along the inner wall of the non-pressure plate when the diaphragm is moved towards the atmospheric chamber. The switch 44 is mounted in a position on the non-pressure plate so that the plunger or actuator 42 lies in the path of movement of the rolling marginal portion 27 of the diaphragm but is spaced along said path so that during normal maximum movement of the diaphragm the actuator 42 is not contacted by the rolling portion of the diaphragm which extends only partially along the wall 40 as indicated by the first dotted line position 52. However, as the actuated member, for example brake linings, become worn, the diaphragm must move increasingly further to the rolling marginal portion 27 of the right in the drawing to effect a brake setting. As the brake linings continue to wear the diaphragm eventually contacts the plunger 42 as indicated by the second dotted line position 54. Upon this occurrence, the switch 44 is closed, energizing the alarm 50 to indicate to the operator that the slack adjuster or other brake adjustment must be reset to restore diaphragm movement to its normal range, or, if brake lining replacement is required, this fact will also be communicated to the operator.

In addition to indicating brake wear, the proposed system could be modified by the addition of a second switch 44 placed immediately to the rear of the diaphragm so that upon energization of the motor to set brakes, a brake light circuit could be energized to signal following vehicles that the brakes are being applied.

From the above description, it will be apparent that the provision of a diaphragm operated switch attached directly to the non-pressure plate of a fluid pressure motor to signal the need for corrective attention to the actuated member, eliminates costly and easily deranged linkages or other mechanism for signalling the required information to the operator. Furthermore, it will be apparent that a non-pressure plate of the preferred design described above need not necessarily be provided since a switch may, in accordance with the invention, be disposed in proper position in the non-pressure plate of conventional motors to be engaged only when the diaphragm travels greater than normal distance. Thus the invention provides a simple and inexpensive means for providing motors presently in use with the signalling means of the invention.

It will be apparent that the invention is susceptible of various modifications and changes without, however, departing from the scope of the appended claims.

What is claimed is:

1. A fluid pressure operated brake actuator comprising a pressure plate, a non-pressure plate, a diaphragm clamped between said plates and dividing the actuator into a pressure chamber and an atmospheric chamber, a push rod having a part movable with said diaphragm for operating the brakes, said diaphragm being of flexible material and having a marginal portion rolling on the inner surface of the non-pressure plate when the diaphragm is subjected to fluid pressure to move the latter and said push rod to operate the brakes, and means for indicating the need for brake adjustment comprising a switch mounted on the non-pressure plate, said switch having an actuator projecting into the atmospheric chamber to be engaged and moved by the rolling marginal portion of the diaphragm upon greater than normal movement thereof for closing said switch, and signalling means energized upon closing of said switch.

2. A brake actuator according to claim 1 wherein the non-pressure plate and the switch are respectively provided with cooperating threaded parts for mounting the switch on said non-pressure plate.

References Cited in the file of this patent
UNITED STATES PATENTS

| | | |
|---|---|---|
| 1,461,339 | Wirrer | July 10, 1923 |
| 2,478,575 | Fitch | Aug. 9, 1949 |
| 2,506,208 | Gibson | May 2, 1950 |
| 2,553,291 | Barr | May 15, 1951 |
| 2,558,830 | Drane et al. | July 3, 1951 |
| 2,591,852 | Murray | Apr. 8, 1952 |
| 2,637,794 | Grotenhouse | May 5, 1953 |
| 2,659,381 | Seljos | Nov. 17, 1953 |
| 2,795,189 | Haberland | June 11, 1957 |